(12) United States Patent
Harrison et al.

(10) Patent No.: US 7,166,658 B2
(45) Date of Patent: Jan. 23, 2007

(54) RUBBER REDUCTION

(75) Inventors: Brian H. Harrison, Kanata (CA); Hurdon Hooper, Fredericton (CA)

(73) Assignees: Sorbecon Consultants Inc., Kanata (CA); OPW Enterprises Inc., Fredericton (CA)

( * ) Notice: Subject to any disclaimer, the term of this patent is extended or adjusted under 35 U.S.C. 154(b) by 246 days.

(21) Appl. No.: 10/666,976

(22) Filed: Sep. 18, 2003

(65) Prior Publication Data

US 2004/0214906 A1 Oct. 28, 2004

(30) Foreign Application Priority Data

Apr. 22, 2003 (CA) .................................... 2426253

(51) Int. Cl.
*C08J 11/14* (2006.01)
(52) U.S. Cl. .................. 523/307; 523/343; 521/41; 521/44; 521/45; 585/241; 585/521; 585/832
(58) Field of Classification Search .................. 521/41, 521/44, 45; 523/307, 343; 585/241, 521, 585/832
See application file for complete search history.

(56) References Cited

U.S. PATENT DOCUMENTS

| | | |
|---|---|---|
| 19,172 A | 1/1858 | Hall |
| 22,217 A | 11/1858 | Hall |
| 23,740 A | 4/1859 | Baschnagel |
| 23,805 A | 8/1859 | Baschnagel |
| 25,160 A | 8/1859 | Hall |
| 29,717 A | 8/1860 | Richards |
| 226,070 A | 3/1880 | Heyer |
| 419,697 A | 1/1890 | Mitchell |
| 420,820 A | 2/1890 | Mitchell |
| 425,896 A | 4/1890 | Mitchell |
| 1,169,437 A | 1/1916 | Staunton |
| 1,335,926 A | 4/1920 | Twiss |
| 1,963,943 A | 6/1934 | Gross |
| 2,079,489 A | 5/1937 | Cole |
| 2,154,894 A | 4/1939 | Essex |
| 2,276,248 A | 3/1942 | Kirby |
| 2,287,095 A | 6/1942 | Federman |
| 2,313,146 A | 3/1943 | Hirschberger |
| 2,317,491 A | 4/1943 | Solakian |
| 2,391,714 A | 12/1945 | Kirby et al. |
| 2,794,006 A | 5/1957 | Naudain |
| 3,272,761 A | 9/1966 | Glenn et al. |
| 3,563,922 A | 2/1971 | Massoubre |
| 3,787,166 A | 1/1974 | Schaub et al. |
| 4,051,080 A | 9/1977 | Boccoli |
| 4,052,344 A | 10/1977 | Crane et al. |
| T965,002 I4 | 12/1977 | Crane et al. |
| 4,104,205 A | 8/1978 | Novotny |
| 4,133,446 A | 1/1979 | Albert |
| 4,148,763 A | 4/1979 | Bryson |
| 4,164,265 A | 8/1979 | Kucharczyk |
| 4,264,481 A | 4/1981 | Markvik |
| 4,341,619 A | 7/1982 | Poska |
| 4,384,150 A | 5/1983 | Lyakhevi et al. |
| 4,384,151 A | 5/1983 | Audibert et al. |
| 4,388,171 A | 6/1983 | Beggs et al. |
| 4,395,501 A | 7/1983 | Briggs et al. |
| 4,446,012 A | 5/1984 | Murthy et al. |
| 4,465,888 A | 8/1984 | Paspek, Jr. |
| 4,483,761 A | 11/1984 | Paspek, Jr. |
| 4,544,675 A | 10/1985 | Anderson, Jr. |
| 4,642,401 A | 2/1987 | Coenen et al. |
| 4,657,681 A | 4/1987 | Hughes et al. |
| 5,070,109 A | 12/1991 | Ulick et al. |
| 5,106,513 A | 4/1992 | Hong |
| 5,236,352 A | 8/1993 | Carpenter |
| 5,386,055 A | 1/1995 | Lee et al. |
| 5,400,642 A | 3/1995 | Salvador Palacios et al. |
| 5,418,256 A | 5/1995 | Dhawan et al. |
| 5,437,696 A | 8/1995 | Verkade et al. |
| 5,502,262 A | 3/1996 | Yamasaki et al. |
| 5,516,952 A | 5/1996 | Lee et al. |
| 5,639,934 A | 6/1997 | Yamasaki et al. |
| 5,728,361 A | 3/1998 | Holley |
| 5,731,483 A | 3/1998 | Stabel et al. |

(Continued)

FOREIGN PATENT DOCUMENTS

CA 2025044 12/1999

(Continued)

OTHER PUBLICATIONS

"Pyrolysis", Rubber Manufacturers Association, May 2002, one page.

(Continued)

*Primary Examiner*—Kriellion Sanders
(74) *Attorney, Agent, or Firm*—Pearne & Gordon LLP (57) ABSTRACT

A method of reducing vulcanized rubber is provided. The method comprises the steps of heating the rubber, wherein the rubber includes synthetic rubber, in the presence of a solvent, wherein the solvent includes water to a temperature below a critical temperature of the solvent, providing a pressure that is at least equal to a saturated vapour pressure of the solvent at the temperature and maintaining the temperature and the pressure for a time sufficient to devulcanize the rubber and produce a reaction product that is primarily a solid phase and includes rubber hydrocarbon.

23 Claims, 6 Drawing Sheets

U.S. PATENT DOCUMENTS

| | | | |
|---|---|---|---|
| 5,771,821 | A | 6/1998 | Zhuravsky et al. |
| 5,780,518 | A | 7/1998 | Mulyarchik et al. |
| 5,843,386 | A | 12/1998 | Makino et al. |
| 5,852,062 | A | 12/1998 | Carpenter |
| 5,891,926 | A | 4/1999 | Hunt et al. |
| 5,905,095 | A | 5/1999 | Adkins |
| 6,001,144 | A | 12/1999 | Takeuchi et al. |
| 6,066,263 | A | 5/2000 | Makino et al. |
| 6,107,532 | A | 8/2000 | Saito et al. |
| 6,180,845 | B1 | 1/2001 | Catallo et al. |
| 6,335,377 | B1 | 1/2002 | Izumoto et al. |
| 6,352,674 | B1 | 3/2002 | Matsubara et al. |
| 6,362,241 | B1 | 3/2002 | Bowers et al. |
| 6,380,269 | B1 | 4/2002 | Benko et al. |
| 6,387,965 | B1 | 5/2002 | Benko et al. |
| 6,462,099 | B1 | 10/2002 | Benko et al. |
| 6,462,230 | B1 | 10/2002 | Nagase et al. |
| 6,504,068 | B1 | 1/2003 | Matsubara et al. |
| 6,548,560 | B1 | 4/2003 | Kovalak et al. |
| 6,576,680 | B1 | 6/2003 | Ohshima et al. |
| 2001/0007049 | A1 | 7/2001 | Takasaki et al. |

FOREIGN PATENT DOCUMENTS

| | | |
|---|---|---|
| CA | 2307973 | 12/2000 |
| DE | 9910 | 6/1880 |
| DE | 44 47 357 A1 | 6/1996 |
| EP | 0 775 738 A1 | 5/1997 |
| EP | 0 694 600 B1 | 4/1999 |
| EP | 1 101 812 A1 | 5/2001 |
| GB | 160779 | 3/1921 |
| GB | 1 384 555 | 2/1975 |
| WO | 95/20007 | 7/1995 |
| WO | 96/38496 | 12/1996 |

OTHER PUBLICATIONS

"Science and Technology of Reclaimed Rubber", D.S. Le Beau, Rubber Chemistry and Technology, 40, (1967), p. 217-237.

"Pyrolysis Process for Scrap Tires", Shigeo Kawakami et al., ACS Symposium Series 130, (1980), p. 557-572.

"Characterization of pyrolytic light naphtha from vacuum pyrolysis of used tyres Comparison with petroleum naphtha", B. Benallal et al., Fuel, 74, No. 11, (1995), p. 1589-1594.

"Composition of oils derived from the batch pyrolysis of tyres", Adrian M. Cunliffe et al., Journal of Analytical and Applied Pyrolysis, 44, (1998), p. 131-152.

"The pyrolysis of automotive tyre waste", P T Williams et al., Journal of the Institute of Energy, 68, (1995), p. 11-21.

"Pyrolysis of automobile shredder residue: an analysis of the products of a commercial screw kiln process", M. Day et al., Journal of Analytical and Applied Pyrolysis, 37, (1996), p. 49-67.

"Pyrolysis of automobile tyre waste. Influence of operating variables and kinetics study", Juan F. Gonzalez et al., Journal of Analytical and Applied Pyrolysis, 58-59, (2001), p. 667-683.

"Subcritical and Supercritical Extraction of Oil from Used Automotive Tire Samples", Toshitaka Funazukuri et al., Journal of Chemical Engineering of Japan, 18, No. 5, (1985), p. 455-460.

"Supercritical Extraction of Used Automotive Tire With Water", Toshitaka Funazukuri et al., Journal of Chemical Engineering of Japan, 20, No. 1, (1987), p. 23-27.

"Statistical study of the liquefaction of used rubber tyre in supercritical water", Sangdo Park et al., Fuel, 76, No. 11, (1997), p. 999-1003.

"Supercritical fluid extraction of scrap tyres", John R. Kershaw, Fuel, 77, No. 9/10, (1998), p. 1113-1115.

"Depolymerization Reactions of cis-Polyisoprene and Scrap Rubber in Supercritical Toluene", Jagdish C. Dhawan et al., American Chemical Society Symposium, 514, (1993), p. 380-394.

"Reaction Products of Styrene-Butadiene ABA Block Copolymer in Supercritical Toluene and Tetralin", Jagdish C. Dhawan et al., The Journal of Supercritical Fluids, 4, (1991), p. 160-165.

"Extraction with supercritical fluids: Why, how, and so what", Gale G. Hoyer, Chemtech, (1985), p. 440-448.

*Prior Art*

RUBBER REDUCTION

FIELD OF THE INVENTION

The invention generally relates to rubber reduction, and more particularly to rubber reduction using solvent extraction techniques at a subcritical temperature.

BACKGROUND OF THE INVENTION

It is estimated that in many countries the number of used tires produced per year is approximately equal to the population of the country. As an example there are more than 250 million used tires produced annually in the United States. Methods of dealing with these used tires can generally be placed in two categories; disposal and reclamation. The former group includes land filling and stock piling which are increasingly unacceptable options for a multitude of reasons. Within the latter group are approaches that use the tires in close to their original state with possibly some physical processing. Examples of uses within the above group include use as vibration and debris dampening mats as may be used in drilling operations or filler material for road construction and burning as a source of energy. Burning has at times and in certain areas represented up to 40% of the tires being discarded. Most of the applications in the above group represent a limited volume of tires and do not exploit the economic value imparted on the raw materials during the original fabrication of the tire.

Another group of reclamation methods look to extracting increased value from the constituent materials within a tire. The major constituents include synthetic and natural rubber, carbon black and steel and minor constituents include sulphur and any stabilizers. The processes within this group may be referred to as reduction processes where the tire is being reduced to its constituents.

Reclamation of natural rubber using water, and more particularly steam, is known in the art. It has been disclosed that natural rubber can be reclaimed by processing with steam at temperatures above 100° C. The disclosed pressures include the saturated water vapour pressure. The disclosed methods provide for the devulcanization of natural rubber and possibly some depolymerization, depending on the particular reaction conditions.

Figure 1:
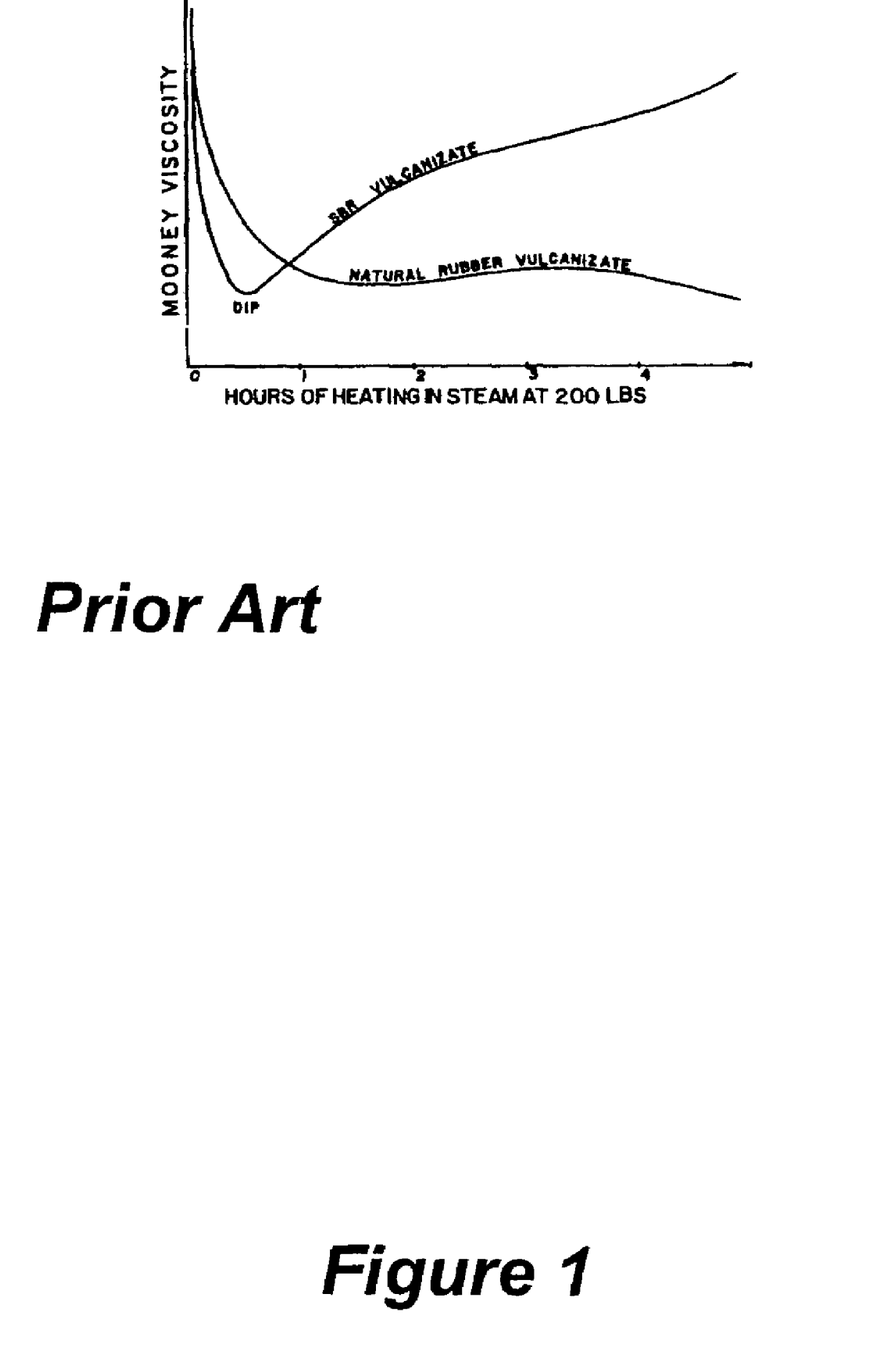
FIG. 1 is a schematic diagram of viscosity v. time for natural rubber and SBR.

It however became common practice to reclaim natural rubber at temperatures around 200° C. and pressures of around 200 psi. It was subsequently determined that synthetic rubbers could not be reclaimed using these latter conditions. D. S. LeBeau, discusses the reclamation of rubber that includes styrene-butadiene rubber (SBR), a synthetic rubber, using steam in *Science and Technology of Reclaimed Rubber*, Rubber Chemistry and Technology 40, 1967, 217–237. FIG. 1, FIG. 1 of LeBeau, illustrates effect of steam treatment on natural rubber and SBR. Natural rubber softens i.e. the viscosity is lowered and can be reclaimed when exposed to 200 psi steam. However, SBR experiences a short-lived softening that is followed by an extended hardening. LeBeau notes that the rate of hardening increases with increasing temperature. LeBeau further notes that the reclamation of synthetic rubbers therefore requires reclaiming agents or catalysts.

One process used for the reduction of used tires that include synthetic rubbers is pyrolysis. In a typical pyrolysis process the tires are subjected to temperatures between 600 and 900° C. in either an inert atmosphere or a vacuum. This process produces light oils and char where the char contains carbon black and pyrolytic carbon formed by the carbonization of rubber hydrocarbon.

Pyrolysis is generally not seen as a desirable reduction process. With the rubber hydrocarbons being either reduced to light oils or carbonized to char the end products of a pyrolysis process do not retain much of the economic value associated with the original rubber hydrocarbon and carbon black.

Reduction processes typically include devulcanization and depolymerization steps or processes. The devulcanization process breaks sulphur-sulphur and sulphur-carbon bonds that cross-link rubber molecules. The devulcanization process produces a solid residue where the mass of the solid residue is approximately 100% of the original mass of tire. The solid residue contains rubber hydrocarbon and carbon black where rubber hydrocarbon includes any hydrocarbon with a molecular weight above that of oil that originates from the initial rubber. The rubber hydrocarbon has an average molecular weight that is generally less than the initial rubber but much greater than oil, where oil has an average molecular weight of approximately 500 or less.

The depolymerization process reduces the average molecular weight of the rubber hydrocarbon by breaking carbon-carbon bonds of the rubber hydrocarbon until, at completion, the rubber hydrocarbon has been reduced to oil. Thus the depolymerization process, at completion, reduces the molecular weight from around 200,000 to 500. At the end of the depolymerization process the mass of solid residue is approximately 40% of the initial mass of tire. At this point the solid residue is substantially only carbon black with the rubber hydrocarbon being completely reduced to oil.

Figure 2A:
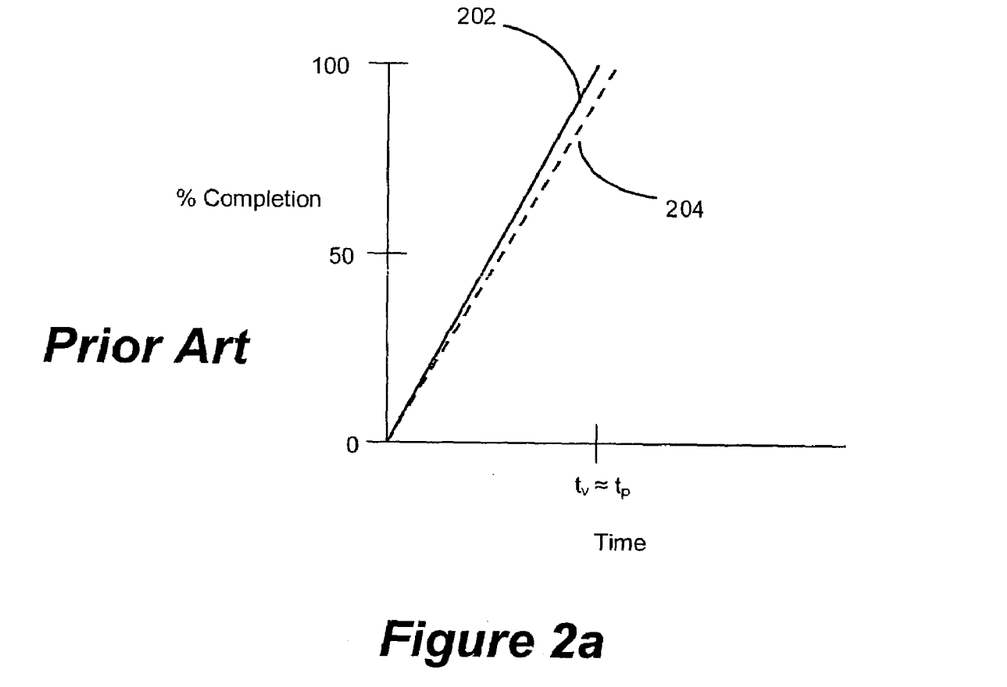
FIG. 2*a* is a schematic graph illustrating % completion v. time for a pyrolysis reduction process.
Figure 2B:
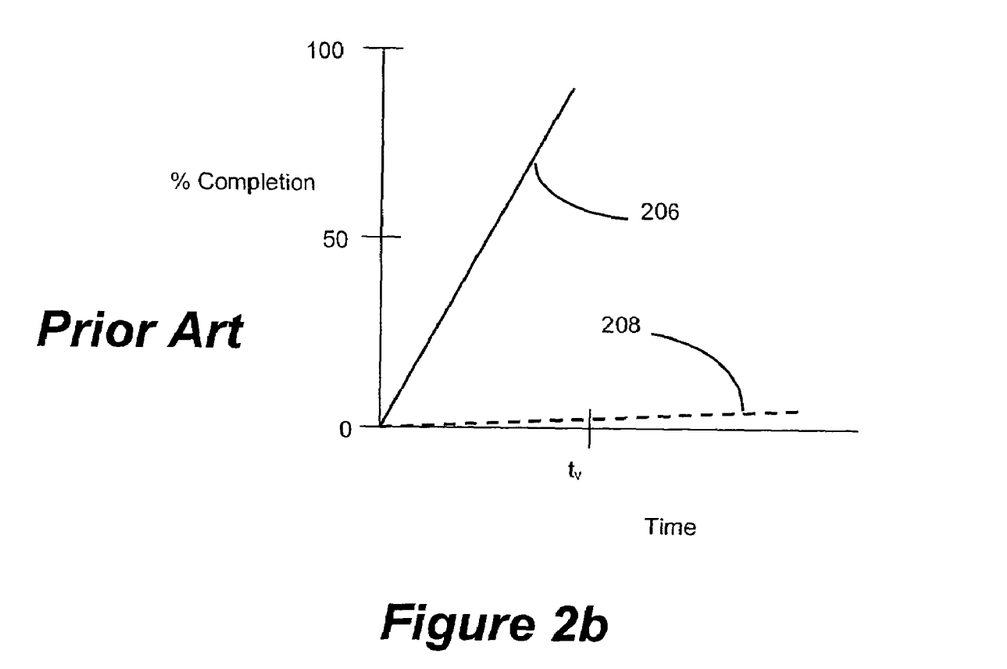
FIG. 2*b* is a schematic graph illustrating % completion v. time for a non-pyrolysis reduction process.

FIG. 2a is schematic graph of the % completion v. time for a typical pyrolysis process. In a typical pyrolysis process a devulcanization process 202 and a depolymerization process 204 occur substantially in parallel. As such the two processes are complete at approximately the same time i.e. $t_v \approx t_p$. FIG. 2b shows a non-pyrolysis process in which the devulcanization process 206 is separated from the depolymerization process 208. At time $t_v$ the devulcanization process 206 is complete while the depolymerization process 208 is only a fraction of the way to completion.

An alternative approach for reducing tires uses solvent extraction techniques. Solvent extraction uses elevated temperatures and pressures in the presence of a solvent to at least devulcanize and often depolymerize the rubber. In almost all of the work in this area processing is conducted at a temperature and pressure that are above the critical values of these parameters for the particular solvent in which processing is being conducted.

Supercritical reaction conditions are defined as having a reaction temperature that is above the critical temperature and a pressure that is above the critical pressure. Supercritical reactions have been performed using a variety of solvents including alcohols, organic solvents and water. Much of the work using supercritical reaction conditions has been directed to extensive depolymerization of the rubber. In particular work has been directed to the reduction of the rubber to oil. Supercritical processing has been found to be advantageous in these cases as it provides a feasible reaction rate for the required depolymerization reactions. However, as the resulting oil will generally be used as a fuel the economic value of the rubber is reduced to a level well below that of that imparted to the tire during initial processing.

Recently there has been work directed to the devulcanization of rubber while mitigating depolymerization of the devulcanized hydrocarbons. By maintaining the hyrodrocarbon chain length near its original value a higher proportion of the economic value imparted to the rubber during initial processing is maintained. U.S. Pat. No. 6,548,560 to Kovalak et al. discloses the use of subcritical processing with a solvent selected from alcohols and ketones while U.S. Pat. No. 5,891,926 to Hunt et al. discloses subcritical processing conditions with the use of 2-butanol as a solvent. The use of the above solvents allowed processing temperatures below 300° C. which Kovalak et al. teach as important in reducing the amount of polymer degradation. Thus their focus is on solvents that have a critical temperature between 200 and 350° C. Hunt et al. and Kovalak et al. do not however disclose complete devulcanization of the rubber.

Many organic solvents are however costly and have properties that make them less than desirable with regard to health and safety considerations. For example, 2-butanol is flammable, has a low flash point and is an irritant.

SUMMARY OF THE INVENTION

The invention is directed to a method for the reduction of rubber. An object of the invention is to mitigate one or more disadvantages in the prior art. A further object of the invention is to provide a method for the reduction of rubber that includes synthetic rubber using a solvent that includes water where at least a portion of reaction product has a molecular weight that is larger than oils.

According to one aspect of the invention a method of reducing vulcanized rubber is provided. The method comprises the steps of heating the rubber, wherein the rubber includes synthetic rubber, in the presence of a solvent, wherein the solvent includes water to a temperature below a critical temperature of the solvent, providing a pressure that is at least equal to a saturated vapour pressure of the solvent at the temperature, and maintaining the temperature and the pressure for a time sufficient to devulcanize the rubber and produce a reaction product that is primarily a solid phase and includes rubber hydrocarbon.

According to another aspect of the invention a method of reducing a vulcanized tire is provided. The method comprises the steps of heating the tire, wherein the tire includes synthetic rubber, in the presence of a first solvent, wherein the first solvent includes water, to a temperature below a critical temperature of the first solvent, providing a pressure that is at least equal to a saturated vapour pressure of the solvent at the temperature, maintaining the temperature and the pressure for a time sufficient to devulcanize the tire and produce a reaction product that is primarily a solid phase and includes rubber hydrocarbon, washing and drying the solid phase of the reaction product, dissolving the rubber hydrocarbon in a second solvent, the second solvent being appropriate for the dissolution of rubber hydrocarbon therein, separating the carbon black from the reaction product and separating the second solvent from the rubber hydrocarbon.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

Like numerals identify like features within the drawings.

DETAILED DESCRIPTION OF THE INVENTION

An embodiment of the current invention provides a method for the reduction of rubber using subcritical water i.e. the reduction process occurs at a temperature below the critical temperature of water. The term "critical temperature of water" as used herein is defined as the temperature above which steam cannot be liquefied by the application of pressure. The critical temperature of water is 374° C. The method allows for at least some separation of the devulcanization and depolymerization processes, using a low cost, non-flammable, non-toxic and environmental friendly solvent.

Process parameters for subcritical fluid techniques include pressure, temperature, solvent and time. Without being bound by theory it appears that operation of the process at temperatures below the critical temperature of the solvent allows for the separation of the devulcanization and the depolymerization processes. The rate of depolymerization process is lowered to an extent where it is effectively separated from the step of devulcanization. This allows improved control regarding the extent to which depolymerization is allowed to proceed. In an embodiment of the invention the reaction time and temperature are varied to provide substantially complete devulcanization and a desired amount of depolymerization.

Figure 3:
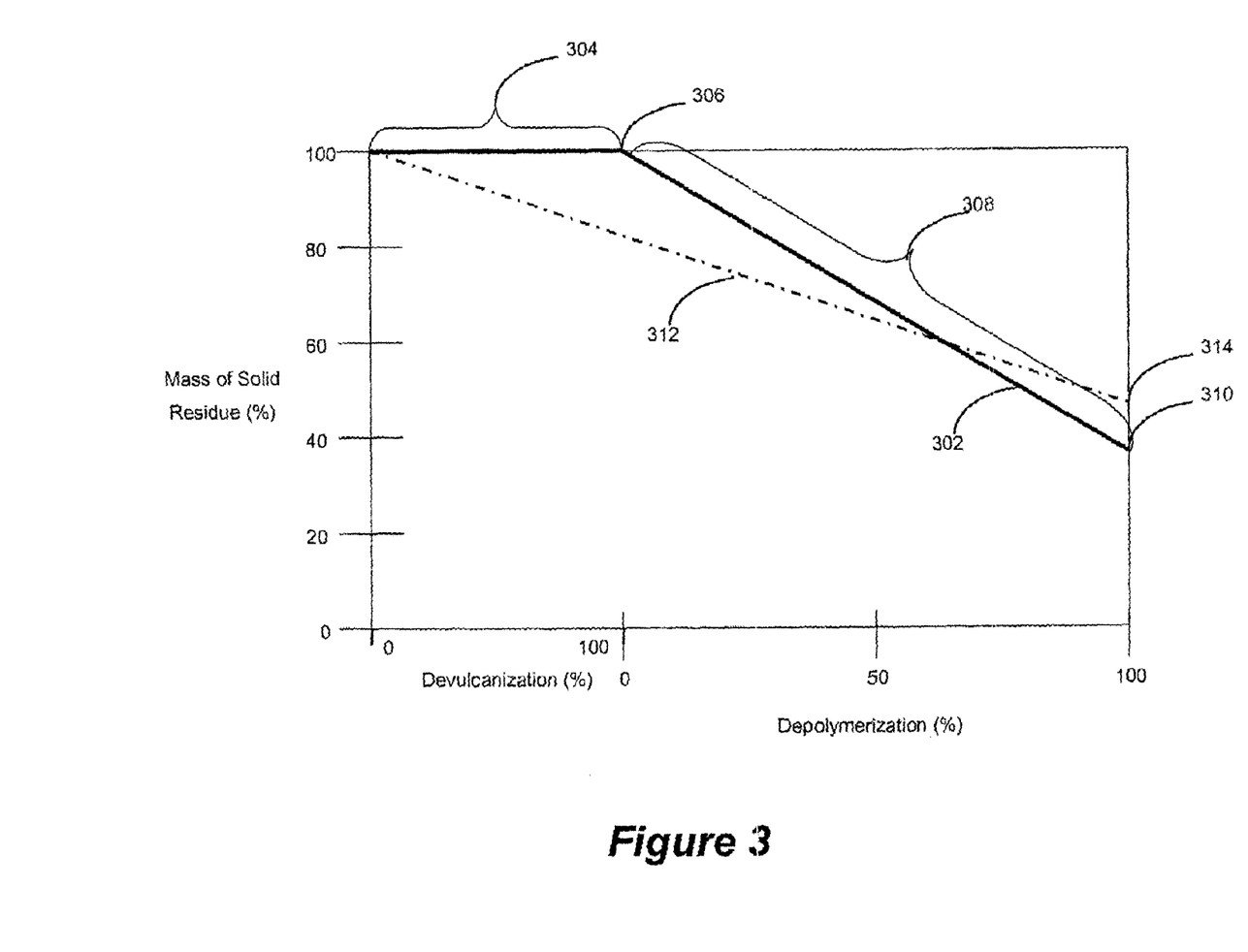
FIG. 3 is a schematic graph of mass of solid residue vs. stages of reduction process.

FIG. 3 presents a schematic graph of mass of solid residue v. stages in the tire reduction process. A line 302 represents a non-pyrolysis process while a line 312 represents a typical pyrolysis process. The line 312 i.e. a typical pyrolisis process is complete at a point 314 where rubber hydrocarbon have been reduced to light oils and some has been carbonized to char.

The line 302 contains a devulcanization portion 304 and a depolymerization portion 308. At a point 306 the initial rubber has undergone substantially 100% devulcanization. At the point 306 the mass of solid residue is essentially 100% with the solid residue containing rubber hydrocarbon and carbon black. During the depolymerization portion 308 the average molecular weight of the rubber hydrocarbon is reduced. At the end of the depolymerization process the rubber hydrocarbon is substantially a mixture of oils and carbon black, where the oils generally have average molecular weights of less than about 500. The solid residue at the end of the depolymerization process i.e. at a point 310 is substantially carbon black. The variance between the points 310 and 314 represents the formation of char in the pyrolysis process.

Figure 4:
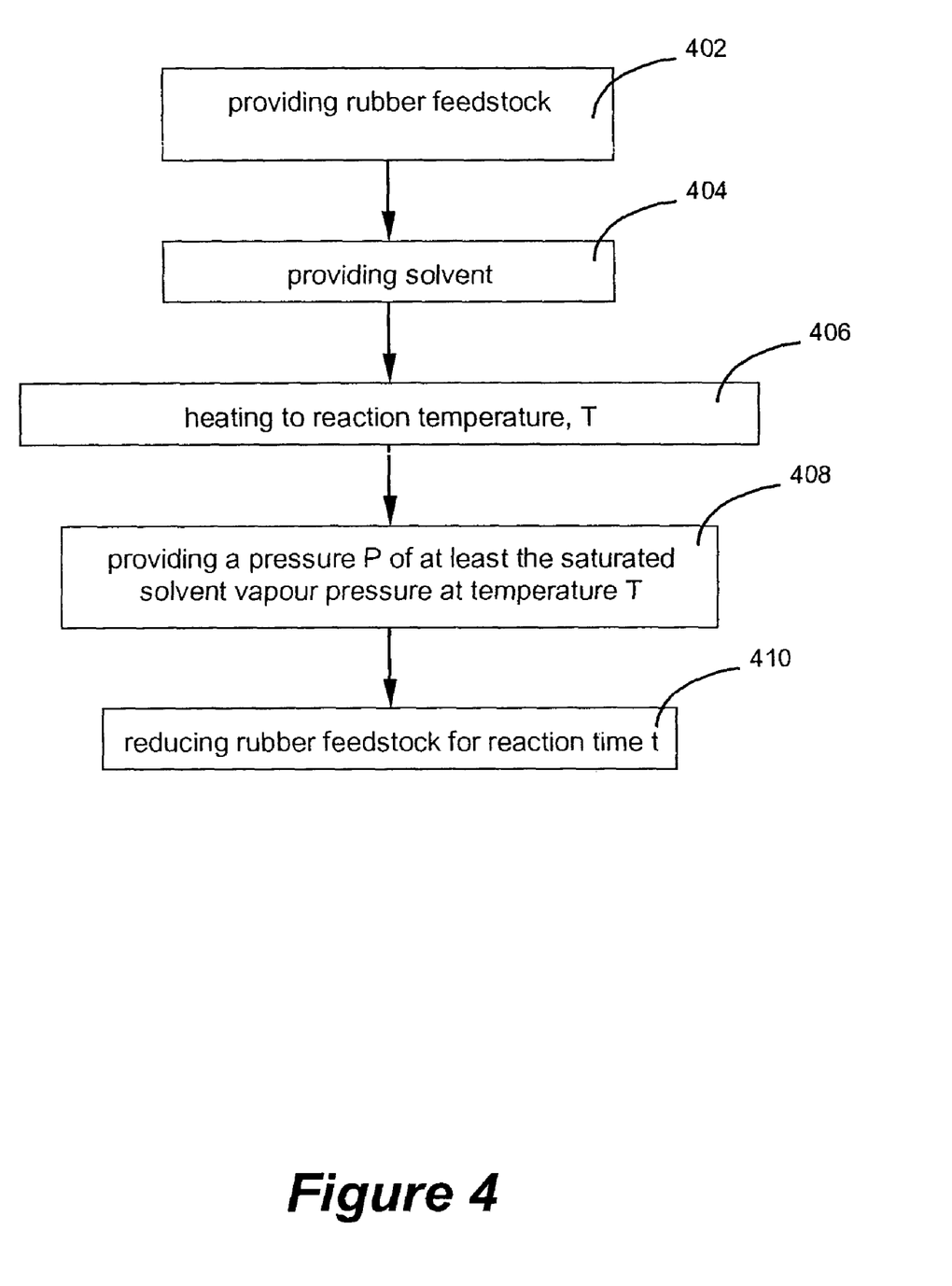
FIG. 4 is a flow chart of a process for reducing tires according to an embodiment of the invention.

A flow chart of a reduction process according to an embodiment of the invention is presented in FIG. 4. Rubber feedstock is provided to a reactor suitable for temperatures and pressures appropriate for subcritical treatment with a solvent at step 402. The rubber feedstock may be any vulcanized rubber that includes synthetic rubber. Typical synthetic rubbers include synthetic polyisoprene rubber, polybutadiene rubber, styrene-butadiene rubber, isoprene-butadiene rubber, styrene-isoprene rubber, styrene-isoprene-butadiene rubber, nitrile rubber, bromobutyl rubber and chlorobutyl rubber. The above list of rubbers is not meant to be limiting. Other appropriate rubbers will, upon consideration of the above list, be apparent to one of skill in the art. In the current exemplary embodiment the rubber feedstock is used automobile tires.

In the current exemplary embodiment the automobile tires used as rubber feedstock are shredded. The shredding process produces pieces or rubber with anisotropic dimensions. The pieces are between about 1 and about 4 mm thick and had a surface area of between about 0.5 and about 5 cm$^2$. The pieces are more typically between about 1 and about 2 mm thick and have a surface area of between about 1 and about 2 cm$^2$. While the rubber feedstock has been shredded in the above embodiment the invention is by no means limited to a particular size of rubber feedstock. For example, the method of the invention can also be applied to whole tires. Thus, the method of the invention is independent of the size of rubber feedstock.

A solvent is provided to the reactor at step 404. In the current exemplary embodiment the solvent is water. The amount of solvent provided is sufficient to provide the saturated solvent vapour pressure at the reaction temperature while maintaining some solvent in the reactor. In the current exemplary embodiment the solvent within the reactor is sufficient for the tire feedstock to be immersed in the solvent at the reaction temperature and remains so for the duration of the reduction process. In an alternative embodiment the rubber feedstock is placed in a basket such that the rubber is above the level of the solvent for the duration of the reduction process.

The reactor is heated to the reaction temperature, T, at step 406. To maintain a subcritical reaction the reaction temperature must be less than the critical temperature of the solvent. In the current exemplary embodiment the temperature is less than 374° C. In an embodiment of the invention the reaction temperature is preferably between about 260° C. and about 370° C. The reaction temperature is more preferably between about 290° C. and about 320° C.

Prior to attaining the desired reaction temperature air present in the reactor is purged. In the current exemplary embodiment the air present in the reactor is purged with steam generated during the heating step. Other appropriate means for purging air from the reactor, including purging with an inert gas, will be apparent to those of skill in the art. Once the air has been purged the reactor is sealed from the external environment.

A pressure is provided to the reactor at step 408. This pressure is equal to or greater than the saturated solvent vapour pressure at the reaction temperature. In the current exemplary embodiment the reaction pressure is the saturated water vapour pressure at the reaction temperature. This pressure is solely created by steam present in the reactor. For example, for a reaction temperature of 300° C. the pressure is 1230 psig. In an alternative embodiment pressures greater than the saturated solvent vapour pressure are provided by the application of an inert gas to the reaction chamber. Inert gases appropriate for this pressurization of the reactor include, but are not limited to, nitrogen and argon. Other means of providing pressures above the saturated water vapour pressure will be apparent to those of skill in the art. The use of means to provide a pressure that are independent of the generation of vapour allows control of the fraction of vapour present in the reactor.

The reaction is continued at step 410 for time t to produce a reaction product. The reaction product produced according to the method of the current exemplary embodiment of the invention includes rubber hydrocarbon, carbon black and sulphur. The reaction product may also include, depending on the exact reaction parameters, oil from at least partial depolymerization of the rubber hydrocarbon, and vulcanized rubber feedstock. The reaction product can generally be divided into a solid and liquid phase. The solid phase contains the rubber hydrocarbon, carbon black and any vulcanized rubber. The liquid phase contains any oil that is produced. The liquid phase will be present as a slurry with the water. While not being limited by theory it is believed sulphur is dissolved in the water during the reaction. The sulphur then precipitates from the water upon cooling and is deposited on the solid phase.

Figure 5:
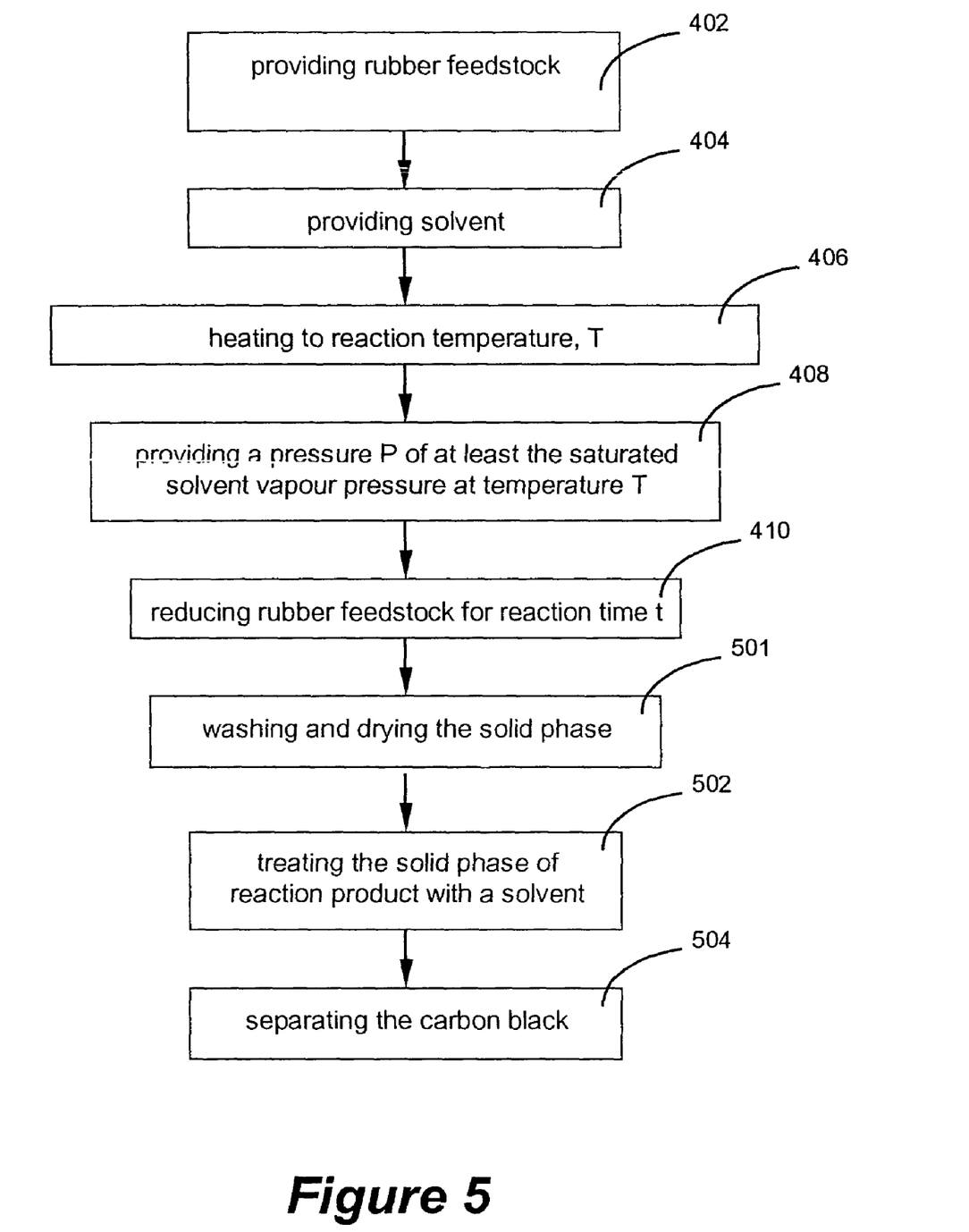
FIG. 5 is a flow chart of a process for reducing tires according to another embodiment of the invention.

A flow chart of a reduction process according to another embodiment of the invention is presented in FIG. 5. The process includes the steps presented in FIG. 4. The process according to this embodiment of the invention further includes the washing and drying the solid phase at step 501. In this embodiment the solid phase is washed with water. At step 502 the solid phase of the reaction product is treated with a solvent. In this embodiment this solvent is cyclohexane. The use of other solvents appropriate for the dissolution of rubber hydrocarbon, including toluene, is also within the scope of the invention. The use of other solvents and mixtures of solvents as appropriate for the dissolution of the rubber hydrocarbon, which may include hydrocarbons of varying molecular weight will be apparent to one skilled in the art. Carbon black is then separated at step 504 using filtration methods. It will be apparent to one skilled in the art that any appropriate techniques may be implemented for the separation of the carbon black form the dissolved reaction product. It will also be apparent that step 504 may be omitted for those rubber feedstocks that do not include carbon black.

Figure 6:
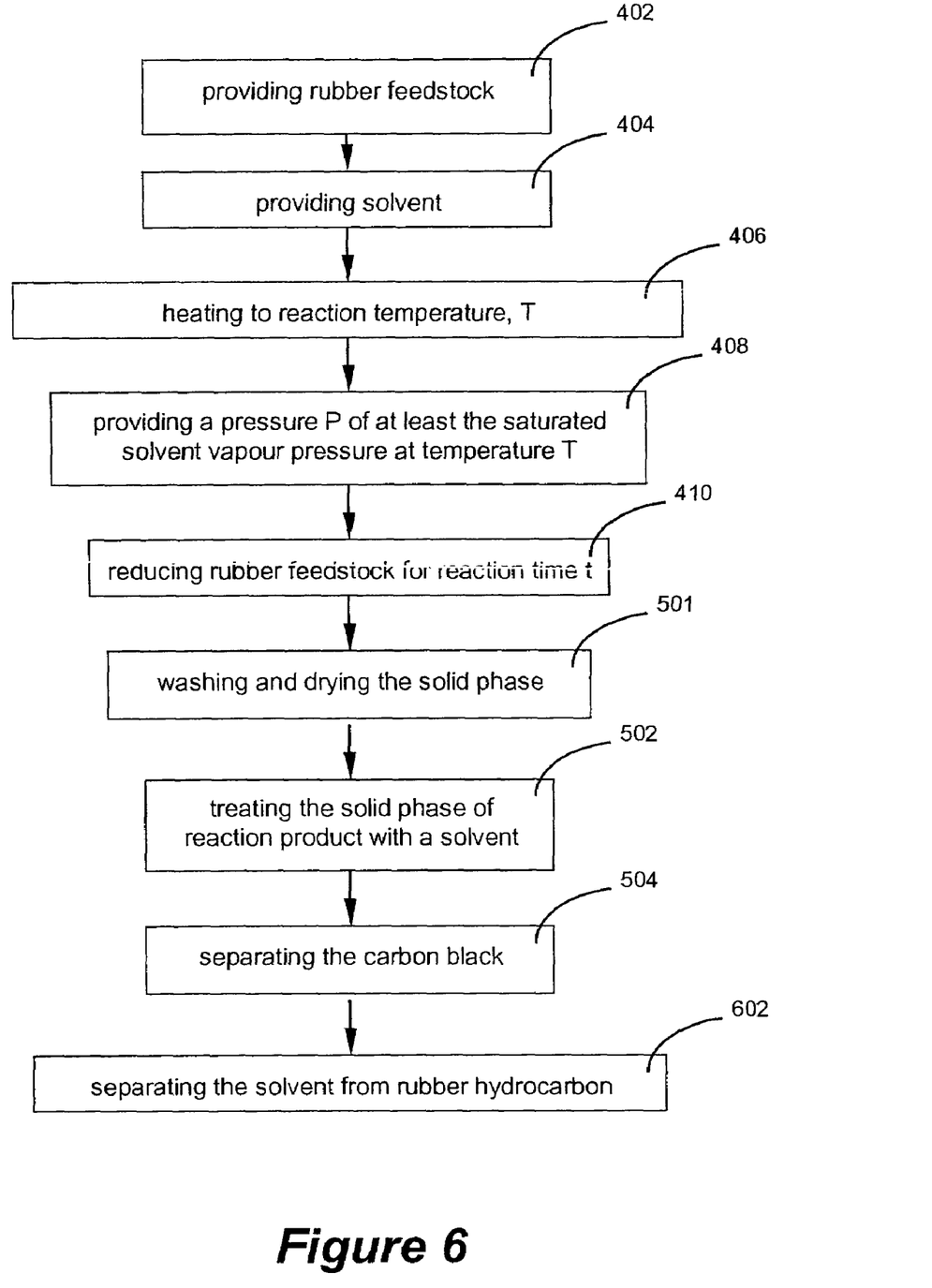
FIG. 6 is a flow chart of a process for reducing tires according to a further embodiment of the invention.

A flow chart of a reduction process according to a further embodiment of the invention is presented in FIG. 6. The process includes the steps presented in FIG. 5. The process according to this embodiment of this invention further includes the step of separating the solvent from the rubber hydrocarbon. Techniques appropriate for separating the solvent from the rubber hydrocarbon will be apparent to one skilled in the art. In this embodiment evaporation is used to separate the solvent from the rubber hydrocarbon.

The embodiments of the invention as outlined above are applicable to and appropriate for batch, semi-continuous and continuous processes.

While the currently preferred solvent is water a mixture of another solvent or solvents with water is also encompassed. In an alternative embodiment of the invention the extraction solvent is a mixture of solvents, where the mixture includes water such that the water plays a role in the extraction/devulcanization process. For example, mixtures of solvents that included 10 weight percent and 30 weight percent ethanol in water were used in reduction processes conducted at temperatures of 280° C., and 290° C. and above. It was found that the % devulcanization was approximately the same when using the mixed solvent compared to 100% water. It is contemplated that alcohols and organic solvents are applicable for mixture with water to form the extraction solvent.

The invention is illustrated by the following examples that are merely for the purpose of illustration and are not to be regarded as limiting the scope of the invention or the manner in which it can be practiced.

EXAMPLES 1–14

In all of the examples the rubber feedstock was from used automobile tires. The tires were processed to remove any steel and fiber belts contained therein. The rubber was shredded to produce chips or shavings having an irregular shape. The chips and shavings were generally between about 1 and about 4 mm thick and had a surface area of between about 0.5 to about 5 cm$^2$. The majority of chips and shavings were between about 1 and about 2 mm thick and had a surface area of between about 1 to about 2 cm$^2$.

A reactor capable of operating at temperatures of up to 500° C. and pressures of up to 5000 psi was used in all experiments. The reactor was charged with between about 20 and about 30 g of rubber and about 100 ml of water. In most experiments the rubber sample was immersed in water in the reactor. In some experiments the rubber sample was held in a perforated basket above the water. Heating was initiated with a valve on the reactor remaining open. This valve was closed after the vessel had reached a temperature greater than 100° C. This allowed for the purging of air from the reactor with steam generated during heating of the reactor. The temperature was raised to the desired reaction temperature and the reaction continued for either one or five hours. At the end of the desired reaction time the reactor was cooled to room temperature and the contents removed.

The nature and relative amount of reaction products present at the end of a reaction are a function of the particular reaction conditions. The reaction products may include vulcanized rubber, rubber hydrocarbon, oil and carbon black. The vulcanized rubber, rubber hydrocarbon and carbon black were present in a solid phase while the oil was present in a liquid phase. The solid phase was washed with water and dried to constant weight in an oven at 100° C. This washing step removed any sulphur that was on the reaction product.

The yield of the rubber reduction process of examples 1–14 is presented in Table 1. The yield (%) is defined by the following expression $$\text{Yield (\%)} = \left( \frac{\text{mass of solid phase}}{\text{mass of rubber feedstock}} \right) * 100$$

The yield as calculated above will decrease with depolymerization. It is apparent from Table 1 that depolymerization starts to occur at around 320° C. Example 7 was run with the rubber feedstock suspended in the vapour. The extent of depolymerization increased with increases in the reaction temperature and with increases in the reaction time.

The rubber hydrocarbon of examples 6, 8 and 9 was analyzed for sulphur content. The sulphur content of the rubber hydrocarbon was 0.19, 0.18 and 0.22% for examples 6, 8 and 9, respectively. Therefore, the measured sulphur content is lower than that of the rubber feedstock indicating that sulphur is extracted from the rubber.

TABLE 1

Percent devulcanization as a function of reaction time and temperature

| Example | TEMPERATURE (° C.) | DURATION (hours) | YIELD (%) |
| --- | --- | --- | --- |
| 1 | 260 | 1 | 100 |
| 2 | 270 | 1 | 100 |
| 3 | 280 | 1 | 100 |
| 4 | 290 | 1 | 100 |
| 5 | 290 | 5 | 100 |
| 6 | 300 | 1 | 100 |
| 7 | 300 | 1 | 100 |
| 8 | 320 | 1 | 95 |
| 9 | 320 | 5 | 86 |
| 10 | 330 | 5 | 78 |
| 11 | 340 | 5 | 63 |
| 12 | 350 | 5 | 50 |
| 13 | 360 | 5 | 45 |
| 14 | 370 | 5 | 44 |

A multi-step separation process was used to separate the various components of the solid phase. The solid phase was mixed with cyclohexane, heated to and held at 60° C. and stirred for up to 1 hour. During this process the rubber hydrocarbon dissolved in the cyclohexane. The mixture was passed through a wire mesh strainer to remove any vulcanized rubber, which would not be dissolved by the cyclohexane. Any vulcanized rubber that was removed during this filtering step was weighed and the mass compared to the initial mass of rubber. The fraction of the sample that was devulcanized was calculated as a percentage. The results are presented in Table 2.

It is apparent from Table 2 that there is a change in the nature of devulcanization between about 280° C. and about 290° C. At reaction temperatures below 290° C. there is minimal devulcanization occurring. Between 260 and 280° C. rubber hydrocarbon and carbon black were removed from the surface of the pieces of rubber. The remainder of the pieces of rubber remained elastic. Thus the pieces experienced surface devulcanization. When reacted at 290° C. for one hour there was 31% devulcanization indicating bulk devulcanization is occurring. When either the reaction time is increased to five hours at a reaction temperature of 290° C. (Example 5) or the reaction temperature is raised to 300° C. (Example 6) or above the sample underwent complete bulk devulcanization. Thus there is a transition from surface to bulk devulvanization.

TABLE 2

Percent devulcanization as a function of reaction time and temperature

| Example | TEMPERATURE (° C.) | DURATION (hours) | DEVULCANIZATION (%) |
| --- | --- | --- | --- |
| 1 | 260 | 1 | <1 |
| 2 | 270 | 1 | <1 |
| 3 | 280 | 1 | 3 |
| 4 | 290 | 1 | 31 |
| 5 | 290 | 5 | 100 |
| 6 | 300 | 1 | 100 |
| 7 | 300 | 1 | 100 |
| 8 | 320 | 1 | 100 |
| 9 | 320 | 5 | 100 |
| 10 | 330 | 5 | 100 |

The mixture that passed through the strainer was passed through filter paper to separate out the carbon black. The extracted carbon black was characterized by measuring its surface area. Nitrogen adsorption on the carbon black was measured at 77° K and a BET equation was used to quote a surface area. A surface area of 60 m²/g measured for the carbon black of Example 8. The extracted carbon black approaches that used in the manufacture of tires.

Finally, the cyclohexane was evaporated to leave the rubber hydrocarbon. The molecular weight of the rubber hydrocarbon was determined using gel permeation chromatography. The weight average molecular weight of the rubber hydrocarbon is presented in Table 3. There is minimal depolymerization occurring until a reaction temperature of 320° C.

TABLE 3

Weight average molecular weight as a function of reaction time and temperature

| Example | TEMPERATURE (° C.) | DURATION (hours) | MOLECULAR WEIGHT (weight average) |
|---|---|---|---|
| 4 | 290 | 1 | 98,000 |
| 6 | 300 | 1 | 99,000 |
| 7 | 300 | 1 | 102,200 |
| 8 | 320 | 1 | 43,600 |
| 10 | 330 | 5 | 11,900 |

The method according to the various embodiments of the invention allow for various end products. First, end products could be obtained directly from the reactor without subsequent separation. For reaction conditions that produce complete devulcanization with minimal depolymerization the reaction product will have a carbon black to rubber hydrocarbon ratio that is approximately equal to that of the original rubber. Thus the reaction product can be used as an extended for rubber formulations. Second, the end product could be rubber hydrocarbon extracted from the reaction product and has had its carbon black removed. It is further possible to set the reaction conditions to tailor the molecular weight of the rubber hydrocarbon. Third, the carbon black that has been isolated from the rubber hydrocarbon can be isolated as an end product. One can also provide a mixture, of a specified ratio of the carbon black and rubber hydrocarbon. For example, carbon black with 10–20% rubber hydrocarbon could be used to facilitate the mixing of carbon black in rubber formulations. Finally, a low temperature reaction could be used to produce surface modified crumb rubber.

It will be apparent to one skilled in the art that tires can include any vulcanized rubber tire as may be used for transportation purposes. It will also be apparent to one of skill in the art that other vulcanized rubber products that include synthetic rubber may be used as a feedstock.

It will also be apparent to one of skill in the art that the processing conditions presented above are with respect to one embodiment of the invention. The invention encompasses those processing parameters i.e. temperature, pressure, time that allow for subcritical processing of rubber with a solvent that includes water.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

Variations in the present invention are possible in light of the description of it provided herein. While certain representative embodiments and details have been shown for the purpose of illustrating the invention, it will be apparent to one skilled in the art that various changes and modifications can be made therein without departing from the scope of the invention.

What is claimed is:

1. A method of reducing vulcanized rubber, the vulcanized rubber being present in a reactor, the method comprising the steps of:
   purging air to remove oxygen from the reactor;
   heating the rubber, wherein the rubber includes synthetic rubber, in the presence of a solvent, wherein the solvent includes water to a temperature below a critical temperature of the solvent;
   providing a pressure that is at least equal to a saturated vapour pressure of the solvent at the temperature; and
   maintaining the temperature and the pressure for a time sufficient to devulcanize the rubber and produce a reaction product that is primarily a solid phase and includes rubber hydrocarbon.

2. The method according to claim 1 wherein the solvent is water.

3. The method according to claim 1 wherein the solvent is a mixture of water and an organic solvent and the mixture provides reduction properties similar to that of water.

4. The method according to claim 3 wherein the organic solvent includes alcohol.

5. The method according to claim 4 wherein the organic solvent is alcohol.

6. The method according to claim 2 wherein the temperature is between about 260° C. and about 350° C.

7. The method according to claim 6 wherein the temperature is between about 290° C. and about 320° C.

8. The method according to claim 1 wherein the pressure is at least partially provided for by pressurization with an inert gas.

9. The method according to claim 1 wherein the rubber is a tire.

10. The method according to claim 9 wherein the tire is a whole used tire.

11. The method according to claim 9 wherein the tire is shredded to produce pieces of tire.

12. The method according to claim 11 wherein the pieces of tire have a particle size between about 0.5 mm and about 5 mm.

13. Surface devulcanized rubber produced according to the method of claim 1.

14. Completely devulcanized rubber produced according to the method of claim 1.

15. A method of reducing a vulcanized tire, the tire being present in a reactor, the method comprising the steps of:
   purging air to remove oxygen from the reactor;
   heating the tire, wherein the tire includes synthetic rubber, in the presence of a first solvent, wherein the first solvent includes water, to a temperature below a critical temperature of the first solvent;

providing a pressure that is at least equal to a saturated vapour pressure of the solvent at the temperature;

maintaining the temperature and the pressure for a time sufficient to devulcanize the tire and produce a reaction product that is primarily a solid phase and includes rubber hydrocarbon;

washing and drying the solid phase of the reaction product;

dissolving the rubber hydrocarbon in a second solvent, the second solvent being appropriate for the dissolution of rubber hydrocarbon therein;

separating the carbon black from the reaction product; and separating the second solvent from the rubber hydrocarbon.

16. Rubber hydrocarbon produced according to the method of claim 15.

17. Rubber hydrocarbon that has been devulcanized and at least partially depolymerized according to the method of claim 16, wherein a molecular weight of the rubber hydrocarbon is larger than a molecular weight of oil.

18. Rubber hydrocarbon produced by the process of claim 15 wherein the rubber hydrocarbon is in a mixture that includes carbon black.

19. Rubber hydrocarbon produced by the process of claim 15 wherein the rubber hydrocarbon is substantially free of sulphur.

20. Carbon black produced by the process of claim 15.

21. Carbon black according to claim 20 wherein the carbon black has a surface area of 60 $m^2/g$.

22. Carbon black according to claim 20 wherein the carbon black approaches that used to manufacture tires.

23. A method of reducing a vulcanized tire, the tire being present in a reactor, the method comprising the steps of:

purging air to remove oxygen from the reactor:

heating the tire, wherein the tire includes synthetic rubber, in the presence of water to a temperature between about 290° C. and about 350° C.;

providing a pressure that is at least equal to a saturated vapour pressure of water at the temperature; and maintaining the temperature and the pressure for a time sufficient to devulcanize the tire and produce a reaction product that is primarily a solid phase and includes rubber hydrocarbon.

* * * * *

UNITED STATES PATENT AND TRADEMARK OFFICE
CERTIFICATE OF CORRECTION

PATENT NO. : 7,166,658 B2
APPLICATION NO. : 10/666976
DATED : January 23, 2007
INVENTOR(S) : Brian H. Harrison and Hurdon Hooper

Page 1 of 1

It is certified that error appears in the above-identified patent and that said Letters Patent is hereby corrected as shown below:

On Title Page 2, FOREIGN PATENT DOCUMENTS, after "WO   96/38496   12/1996", please insert
--EP   0 702 076 B1   3/1999
  FR   2 459 822       1/1981--.

Signed and Sealed this

Nineteenth Day of May, 2009

JOHN DOLL
*Acting Director of the United States Patent and Trademark Office*